(12) United States Patent
Howarth et al.

(10) Patent No.: US 7,716,350 B2
(45) Date of Patent: May 11, 2010

(54) METHODS AND DEVICES FOR SHARING CONTENT ON A NETWORK

(75) Inventors: Arthur Howarth, San Jose, CA (US); Pamela Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1265 days.

(21) Appl. No.: 10/693,279

(22) Filed: Oct. 23, 2003

(65) Prior Publication Data
US 2005/0108430 A1    May 19, 2005

(51) Int. Cl.
*G06F 15/16*    (2006.01)

(52) U.S. Cl. ..................................... 709/229

(58) Field of Classification Search ................. 709/219, 709/225, 203, 224, 218, 223; 370/352, 401, 370/466; 713/201; 710/15; 705/59; 341/173; 726/11; 707/1; 340/531; 455/414.1; 725/1
See application file for complete search history.

(56) References Cited

U.S. PATENT DOCUMENTS

| | | | |
|---|---|---|---|
| 6,202,156 B1 | 3/2001 | Kalajan | |
| 6,381,646 B2 | 4/2002 | Zhang et al. | 709/227 |
| 6,463,474 B1* | 10/2002 | Fuh et al. | 709/225 |
| 6,473,406 B1 | 10/2002 | Coile et al. | |
| 6,490,289 B1 | 12/2002 | Zhang et al. | 370/401 |
| 6,584,454 B1* | 6/2003 | Hummel et al. | 705/59 |
| 6,650,641 B1 | 11/2003 | Albert et al. | 370/392 |
| 6,829,474 B1* | 12/2004 | Adachi | 455/414.1 |
| 6,930,598 B2* | 8/2005 | Weiss | 340/531 |
| 6,970,127 B2* | 11/2005 | Rakib | 341/173 |
| 7,003,798 B2* | 2/2006 | Yamakawa et al. | 726/11 |
| 7,197,579 B2* | 3/2007 | Saito et al. | 710/15 |
| 7,213,263 B2* | 5/2007 | Makineni et al. | 726/11 |
| 7,218,643 B1* | 5/2007 | Saito et al. | 370/466 |
| 7,401,120 B2* | 7/2008 | Walbeck et al. | 709/203 |
| 2002/0083342 A1* | 6/2002 | Webb et al. | 713/201 |

(Continued)

FOREIGN PATENT DOCUMENTS

JP    2000-174797    6/2000

OTHER PUBLICATIONS

Yahoo, Geo Cities, "The Way to Build a Better Website", printed Sep. 15, 2004, 1 page. www.geocities.yahoo.com.

(Continued)

*Primary Examiner*—Dustin Nguyen
(74) *Attorney, Agent, or Firm*—Weaver Austin Villeneuve & Sampson LLP (57) ABSTRACT

Method and devices are provided for to simplify, for the user of a home network, the sharing of content with remote users. Some such implementations allow remote users who have logged into the home network to have access to devices and services within the home network. Some implementations of the invention provide solutions for sharing multiple devices within the home network in a grouping to a particular remote user who logs into the home network in a secure fashion. Some methods of the present invention are implemented in part by controlling a gateway of the home network. As such, the necessary hardware and/or software for implementing the invention can be located in a gateway of the home network. In alternative implementations, aspects of the invention may be implemented via a portal service offered by a service provider who also controls the gateway, or by a device in the home network.

15 Claims, 11 Drawing Sheets

U.S. PATENT DOCUMENTS

| | | | | |
|---|---|---|---|---|
| 2002/0103898 | A1* | 8/2002 | Moyer et al. | 709/224 |
| 2002/0152299 | A1* | 10/2002 | Traversat et al. | 709/223 |
| 2003/0018753 | A1* | 1/2003 | Seki | 709/219 |
| 2003/0169727 | A1* | 9/2003 | Curry et al. | 370/352 |
| 2005/0089052 | A1* | 4/2005 | Chen et al. | 370/401 |
| 2005/0149481 | A1* | 7/2005 | Hesselink et al. | 707/1 |
| 2006/0037036 | A1* | 2/2006 | Min et al. | 725/1 |
| 2006/0239254 | A1* | 10/2006 | Short et al. | 370/352 |
| 2007/0174428 | A1* | 7/2007 | Lev Ran et al. | 709/218 |

OTHER PUBLICATIONS

MSN, "Compare MSN Subscriptions", printed Sep. 15, 2004, 2 pages. www.join.msn.com.

Int'l Application No. PCT/US2004/034607, Int'l filing date Oct. 18, 2004, PCT Search report mailed Apr. 15, 2005.

Int'l Application No. PCT/US2004/034607, Int'l filing date Oct. 18, 2004, PCT Written Opinion mailed Apr. 15, 2005.

Chinese Office Action for Filing No. 200480029317.2 dated Oct. 24, 2008.

Chinese Office Action for Filing No. 200480029317.2 dated Apr. 17, 2009.

Third Chinese Office Action dated Aug. 7, 2009 issued 200480029317.2 [P347CN].

Fourth Chinese Office Action dated Nov. 27, 2009 issued in 200480029317.2 [P347CN].

* cited by examiner

METHODS AND DEVICES FOR SHARING CONTENT ON A NETWORK

BACKGROUND OF THE INVENTION

1. Field of the Invention

The present invention relates to network technology. More particularly, the present invention relates to sharing content on a network, e.g., a home network.

2. Description of the Related Art

As home networks become more and more popular and the use of broadband connections becomes commonplace, people are looking for easy ways share content, e.g., with remote Internet users. As used herein, a "home network" refers to any private network, including but not limited to a private network controlled by an individual, a family, a business, a public entity, etc. However, the paradigm case of a home network is literally a network in a home.

The amount of digital content to be shared by the home network may be in the terabytes, when taking into account photos, music, documents, videos, data from Internet cameras, etc. The current solution is to post all content that the consumer wants to share on to public site web servers, such as www.geocities.com, www.msn.com, etc. However, there are several drawbacks to this solution. The space available is limited and extra storage space is costly. Advanced features (such as authentication) are also costly. Not all consumers want to post all of their content in a public place. Moreover, users may find it burdensome to transfer their content to public web servers. Moreover, users may find it burdensome to transfer their content to public web servers.

One possible way to allow the content to remain in the home, secure, and still allow Internet users to access it, would be for the consumer to host his own web server, e.g., on a personal computer ("PC") in his or her home. However, this solution would have at least the following requirements: (1) a dedicated PC running web server software; (2) an Internet gateway that supports network address translation ("NAT") and a firewall, and (3) the expertise to install and configure this equipment and servers.

All of these requirements are potentially problematic for a typical user. The last requirement is beyond the expertise of the vast majority of consumers.

Although the gateway provides the ability for multiple devices/PCs to gain access to the Internet, the devices/PCs are hidden in the home network from the Internet. If a consumer wants to share content from a PC/device behind the gateway to remote Internet users, the tasks of configuring the gateway properly to do port forwarding through NAT, which deals with mapping a selected port or protocol to a particular PC/device, and configuring the firewall to allow access to this PC on the home network, would be quite daunting for the casual consumer. The consumer would also need to install and configure the necessary servers on the PC/device to share the appropriate content.

The content would need to reside on a dedicated web server device and this device would need to remain on at all times. In order to secure the content on the web server, the web server would need to use authentication, which the consumer would need to configure with usernames and passwords. However, this database of usernames and passwords is usually only for a single device. It is not a common database used by all devices/PCs in the home network.

It would be desirable to provide content sharing capabilities for a home network without requiring consumers to be the IT department for the home network, the system administrator for servers running on the PC(s) in the home network and the web page designer in charge of displaying the content in a orderly fashion.

SUMMARY OF THE INVENTION

Method and devices are provided for to simplify, for the user of a home network, the sharing of content with remote users. Some such implementations allow remote users who have logged into the home network to have access to devices and services within the home network. Access to such content, devices and services may be controlled by running a content protocol client on the home network that handles file sharing. This content protocol client could be any suitable type known to those of skill in the art, such as Windows networking (smb), UPnP, etc. Alternatively, the content protocol client could be a proprietary content protocol client. Some implementations of the invention provide solutions for sharing multiple devices within the home network in a grouping to a particular remote user who logs into the home network in a secure fashion.

Some methods of the present invention are implemented in part by controlling a gateway of the home network. As such, the necessary hardware and/or software for implementing the invention can be located in a gateway of the home network. In alternative implementations, aspects of the invention may be implemented via a portal service offered by a service provider who also controls the gateway, or by a device in the home network, such as a Network Attached Storage device (NAS). The invention will sometimes be referred to herein as "Digital Porch."

Some implementations of the invention provide a computer program embodied in a machine-readable medium for providing controlled access to a home network. The computer program includes instructions for causing one or more devices of the home network to perform steps that include the following: receiving a log-in attempt from a remote user, the log-in attempt originating from an Internet protocol address; verifying that the remote user is an authorized user of the home network; generating a network address translation rule associating the Internet protocol address with a port of a device on the home network; displaying a graphical user interface to the remote user, the graphical user interface allowing the remote user to select only content or services that the remote user is authorized to select; receiving a selection request from the remote user; and providing content or services to the remote user according to the selection request.

The computer program may include instructions for causing a gateway of the home network to transmit authentication information regarding the remote user to one or more devices of the home network after verifying that the remote user is an authorized user of the home network.

The computer program may also include instructions for causing a gateway of the home network to communicate with the remote user according to a first protocol different from a second protocol used for communication between the gateway and one or more devices of the home network. The first protocol may be, for example, HTTP and the second protocol may be a content protocol.

Some embodiments of the invention provide a gateway configured to provide controlled access to a home network. The gateway includes a first port configured to receive a log-in attempt from a remote user, the log-in attempt originating from an Internet protocol address, and a second port configured for attaching a network device of the home network. The gateway also includes at least one processor configured to do the following: verify that the remote user is an authorized user of the home network; generate a network address translation rule associating the Internet protocol address with the second port; display a graphical user interface to the remote user, the graphical user interface allowing the remote user to select only content or services that the remote user is authorized to select; receive a selection request from the remote user; and provide content or services to the remote user from a device attached to the second port according to the selection request.

Some aspects of the invention provide a method of providing controlled access to a home network. The method includes these steps: receiving a log-in request from a remote user; capturing the remote user's Internet protocol address; authenticating the remote user; automatically configuring a gateway to allow access to predetermined content, services or devices by the remote user; and providing access to a portion of the predetermined content, services or devices according to a selection of the remote user.

Other embodiments of the invention provide a home network, including: a first network device; and a gateway having a first port and a second port. The gateway is configured to communicate with the first network device via the first port and to communicate with an external network via the second port. The gateway is also configured to do the following: receive a log-in attempt from a remote user, the log-in attempt originating from an address on the external network; verify that the remote user is an authorized user of the home network; generate a network address translation rule associating the address with the first port; display a graphical user interface to the remote user, the graphical user interface allowing the remote user to select only content that the remote user is authorized to select; receive a first selection request from the remote user; and provide content to the remote user from the first network device according to the first selection request.

The gateway may communicate with the first network device via a first protocol different from a second protocol that the gateway uses for communication with the external network. The first network device may be, for example, a personal computer or a network attached storage device.

The home network may also include a second network device. The gateway may be further configured to: display the graphical user interface to the remote user, the graphical user interface allowing the remote user to select services from the second network device that the remote user is authorized to select; receive a second selection request from the remote user; and provide services to the remote user from the second network device according to the second selection request. The second network device may be a web cam or a device for streaming audio data.

Still other aspects of the invention provide a method for providing controlled access to a home network. The method includes these steps: receiving a log-in attempt from a remote user, the log-in attempt originating from an Internet protocol address; automatically verifying that the remote user is an authorized user of the home network; automatically generating a network address translation rule associating the Internet protocol address with a port of a device on the home network; automatically displaying a graphical user interface to the remote user, the graphical user interface allowing the remote user to select only content or services that the remote user is authorized to select; receiving a selection request from the remote user; and automatically providing content or services to the remote user according to the selection request.

The method may also include the step of automatically transmitting authentication information regarding the remote user to one or more devices of the home network after automatically verifying that the remote user is an authorized user of the home network. The method may also include communicating with the remote user according to a first protocol different from a second protocol used for communication between the gateway and one or more devices of the home network. The first protocol may be, for example, HTTP and the second protocol may be a content protocol.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Although content may be provided in different ways according to various aspects of the invention, the primary examples discussed herein involve Internet-based sharing of devices, content, etc. The content could be a mix of documents, pictures, etc.

Figure 1:
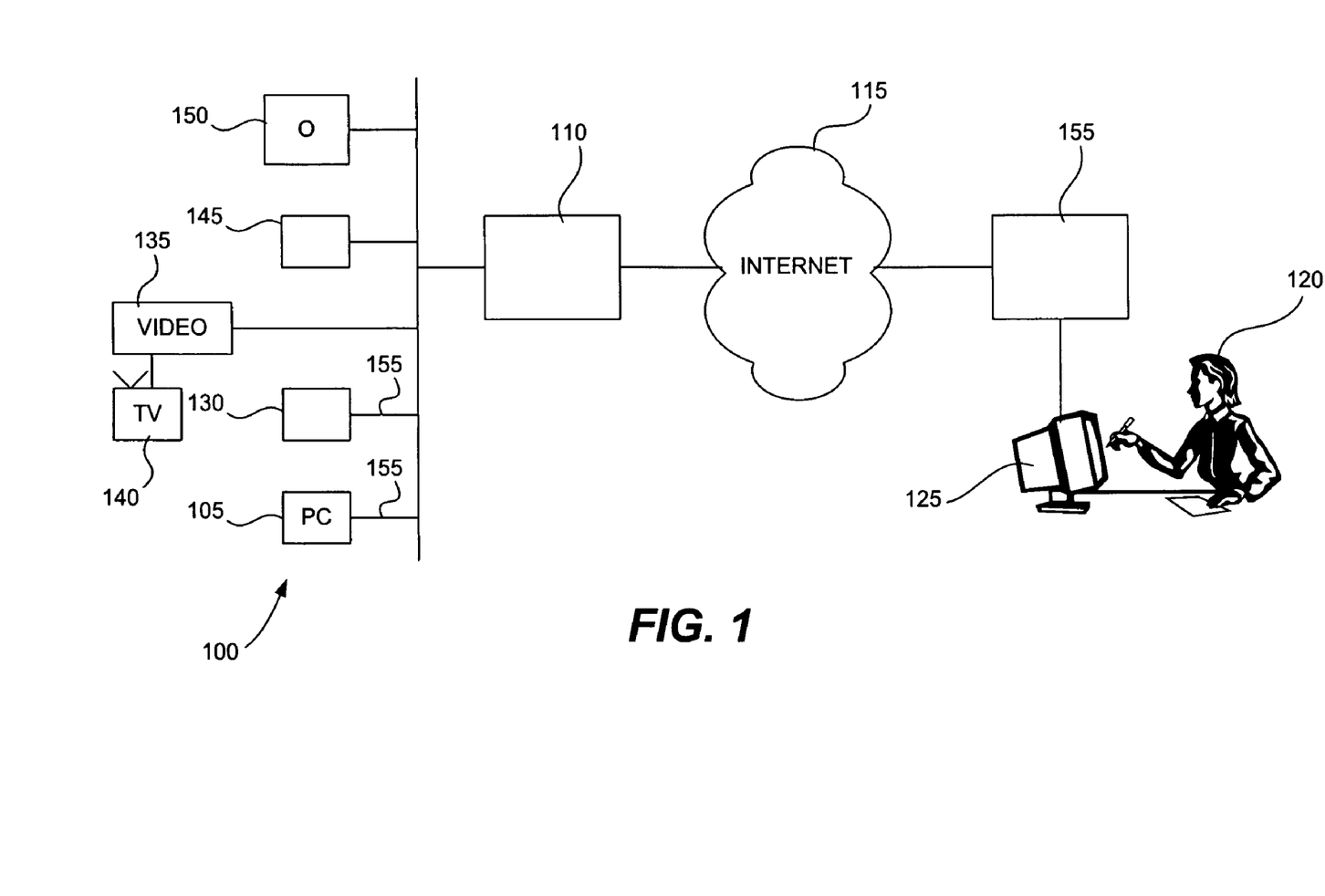
FIG. 1 is a network diagram illustrating a home network being accessed by a remote user.

FIG. 1 depicts a simplified home network 100 for sharing content according to some implementations of the invention. Home network 100 includes network device 105 for storing and sharing content. In this example, network device 105 is a personal computer. However, network device 105 could be any suitable device for storing and sharing content, e.g. a NAS device or a server.

Gateway 110 forms an interface between home network 100 and the outside world. Here, gateway 110 connects home network 100 with Internet 115. Remote user 120 may use device 125 (e.g., a PC) to browse Internet 115 and access home network 100. However, any suitable network may link device 125 with home network 100, e.g., a wide area network, a storage area network, etc.

Home network 100 also includes NAS 130, video device 135, media player 145 (for, e.g., streaming MPEG3 data) and webcam 150. These network devices are attached to various ports 155 of gateway 110.

Gateway 110 supports NAT. Accordingly, all of home network 100 has a single "real" IP address, which in this example is 171.71.97.40. The NAT of gateway 110 makes a "binding" between IP address 171.71.97.40 and a number of private IP addresses, according to a NAT table. In this example, the private IP addresses in the NAT table range from 192.168.1.0 to 192.168.1.9. According to the TCP protocol, the full address of a device includes an IP address and a port number. Here, webcam 150 is attached to port 80 of gateway 110. The full address of webcam 150 is 192.168.1.2:80. The full address of PC 105 is 192.168.1.1:1024.

Without using the methods of the present invention, various difficulties arise when remote user 120 wants to access devices and/or content in home network 100. For one thing, the owner of home network 100 may not know the port numbers to which the various ports are attached. If so, remote user 120 may not know the port numbers either.

Suppose remote user 120 knows that the port number of PC 105 is 1024 and therefore sends the address 171.71.97.40:1024, via Internet 115, in an attempt remotely to access PC 105. Without the proper NAT rules, the NAT supported by gateway 110 may not map the address 171.71.97.40:1024 to the address of PC 105. If the NAT supported by gateway 110 consistently mapped the address 171.71.97.40:1024 to the address of PC 105, this would allow unrestricted access to PC 105.

Figure 2:
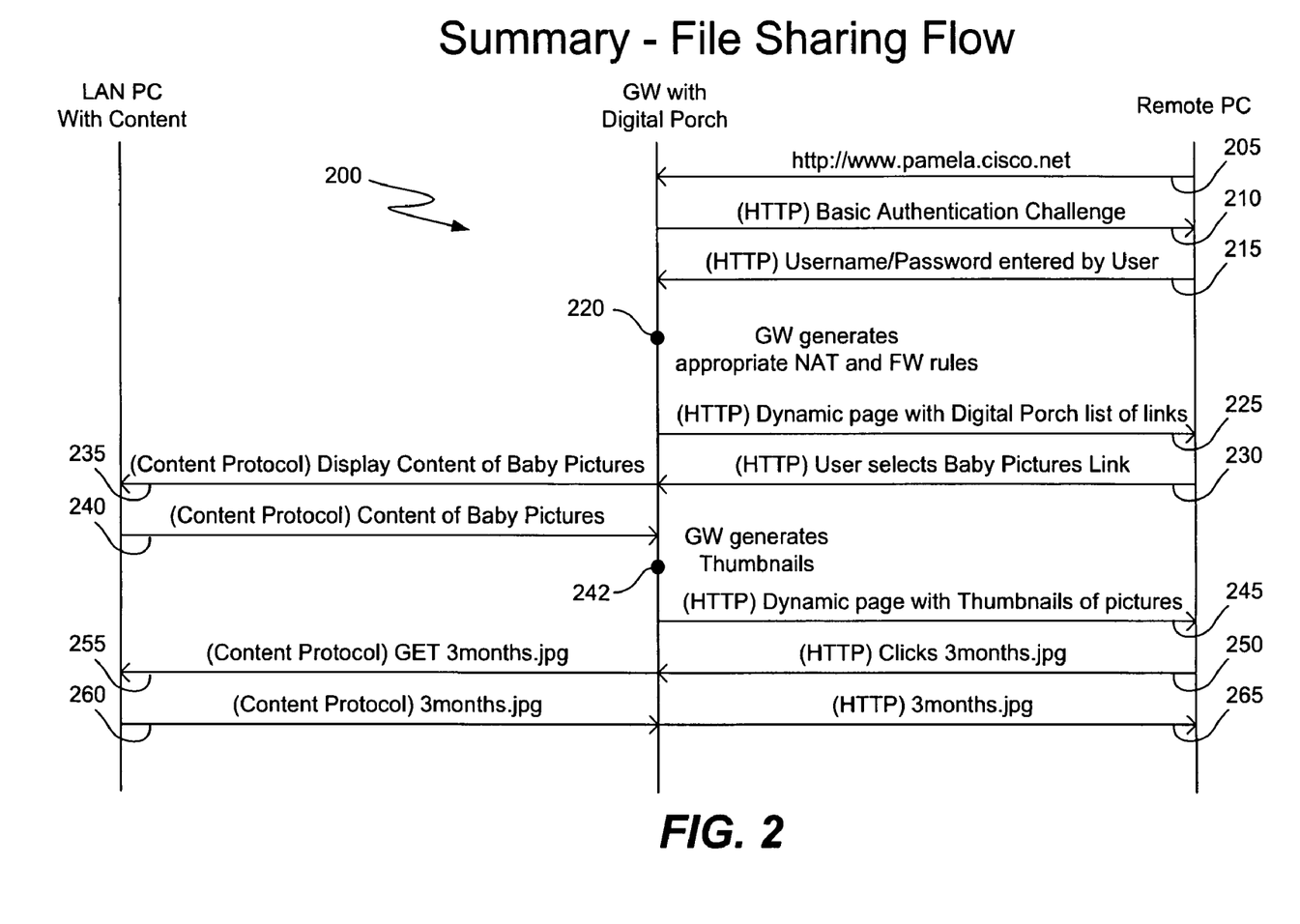
FIG. 2 is a flow diagram illustrating a method of file sharing according to the invention.
Figure 2A:
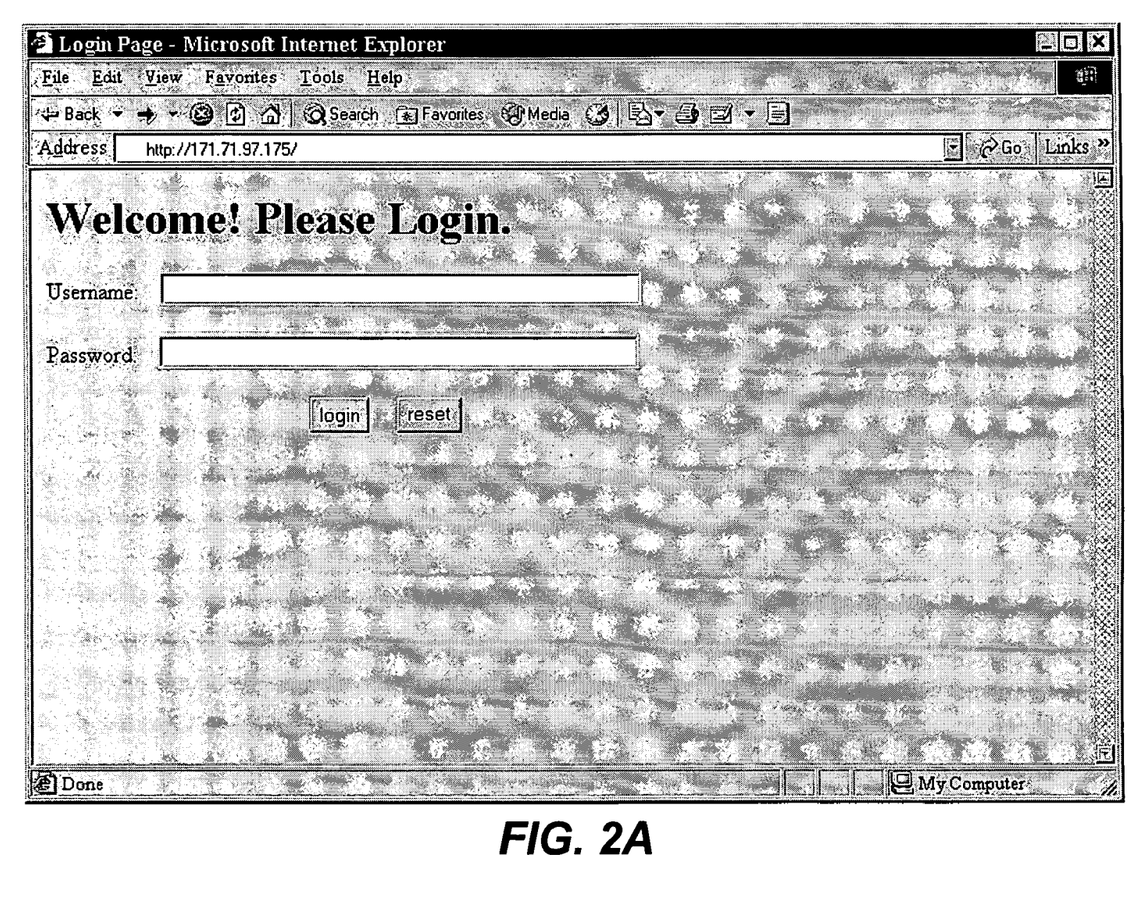
FIG. 2A depicts a log-in screen.

FIG. 2 illustrates a file sharing flow according to one implementation of the invention. In step 205, remote user 120 browses, via Internet 115, to a URL of home network 100. A web server of home network 100 then makes an authentication challenge to remote user 120 (step 210). In this example, the web server prompts remote user 120 for a username and password for the website of home network 100. The prompt may be made by any means known by those of skill in the art. Here, the prompt is made by a graphical user interface ("GUI") in a pop-up window displayed to remote user 120, as depicted in FIG. 2A. In this example, the web server is an HTTP server and is part of gateway 110.

In step 215, remote user 120 transmits a valid username and password to home network 100. The software and/or hardware that controls the gateway to implement this aspect of the invention must therefore have access to a database of valid usernames and passwords. The user database can be on the gateway 110, in a remote database (such as a service provider's RADIUS database), in a user database running on another device in home network 100, etc.

Upon the remote user's successful log-in, information pertaining to the remote user's session (e.g., the source IP address of the remote user's HTTP session) will be captured by home network 100. This information is used to configure automatically the appropriate NAT port translations and firewall rules on the gateway to allow access to LAN devices by that IP address only (step 220).

In this example, the name of remote user 120 is Joe. In one implementation, upon Joe's successful log-in, a NAT rule will automatically be written in a NAT table accessible by gateway 110. The rule may be, for example, 192.168.1.1:1024=171.71.97.40:1024 if {JoeIP}, wherein "JoeIP" is the source IP address captured upon Joe's successful log-in. Other rules would be created as well when other authorized users successfully logged in. In some implementations, a hierarchy of rules is applied that allows different users access to different devices and/or content. Preferably, another rule indicates that a request from a remote user to access home network 100 will be dropped unless one such rule specifically allows access.

For example, there are two logged in users, Joe and Amy. Both Amy and Joe have access to PC 105. The resulting NAT rules would be:

192.168.1.1:1024=171.71.97.40:1024 if {JoeIP}
192.168.1.1:1024=171.71.97.40:1024 if {AmyIP}
Deny all other packets Now another user, Hack, who has not logged in tries to access PC 105 using the known address and port of 171.71.97.40:1024. When the NAT rules are consulted and compared to Hack's request, Hack's request will be denied as it does not match either rule. Hack will not gain access to PC 105's content.

The username and password are propagated to other devices in home network 100 as necessary and where appropriate. In some implementations, the username and password are propagated by authenticating the remote user into all allowed devices at once by an underlying content protocol. In other implementations, the username and password are propagated by using the "REALM" method provided by basic authentication in HTML. As known by those of skill in the art, a "REALM" is a database of usernames and passwords that identify valid users of a web application (or set of web applications), plus an enumeration of the list of roles associated with each valid user. Roles are similar to groups in Unix-like operating systems, because access to specific web application resources is granted to all users possessing a particular role (rather than enumerating the list of associated usernames). A particular user can have any number of roles associated with his or her username.

In step 225, home network 100 displays content available to remote user 120. According to some implementations, dynamic HTML pages are generated to display links and content available to the logged in remote user. In this example, the authenticated remote user is sent to a page that displays links to all of the devices that the user is allowed to access, as well as links to shared content.

Figure 2B:
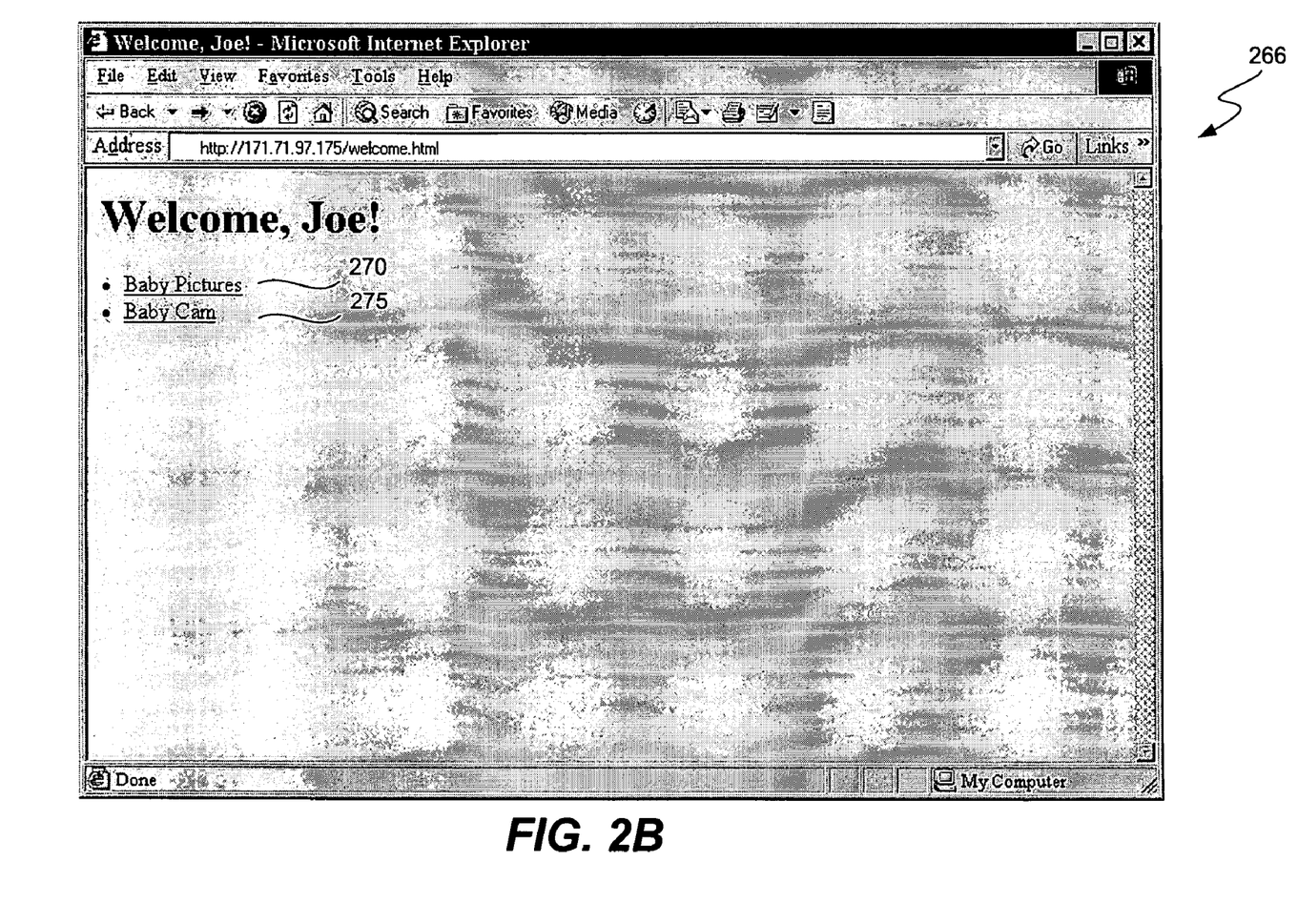
FIG. 2B depicts an exemplary dynamic page generated according to some implementations of the invention.

Dynamic page 266 of FIG. 2B is an example of such a dynamic page. Dynamic page 266 includes link 270 to content (here, baby pictures) on PC 105. If remote user 120 selects link 270 it will direct remote user 120 to another dynamic page showing thumbnails, file name links, etc., from which the desired content may be accessed. The shared files will appear to be local to the device running Digital Porch. In some implementations, this page also displays the availability of each service, e.g., as "on-line" or "off-line."

Although gateway 110 uses HTML to display accessible content, devices, etc., to remote user 120 in this example, other methods of display are within the scope of the invention. In other implementations, other protocols are used as appropriate for, e.g., the type of network being used to access home network 100.

In preferred embodiments, gateway 110 controls encryption and decryption of remote user 120's sessions. The encryption may be, for example, 40 bit, 56 bit or 128 bit DES encryption. In some such embodiments, Secure Sockets Layer (SSL) protocol or TSL protocol is are used for such encryption and decryption.

According to some implementations, a highly secure Digital Porch can be accomplished by encrypting the session in a virtual private network ("VPN") tunnel protocol, such as IPSec, L2TP, or SSH. The VPN tunnel may be created according to any appropriate method known to those of skill in the art. In such implementations, the entire data conversation is encrypted. Data from LAN server devices that do not inherently encrypt the session between themselves and the remote user would be encrypted as the session leaves the home network to the remote user.

Here, the VPN session termination point is gateway 110. However, the remote end's termination point could be device 125 (the remote user's PC and/or gateway) or the service provider's infrastructure. The VPN could be initiated by the remote user, by the service provider, or by either gateway in a gateway-to-gateway VPN configuration. In some implementations, the authentication of the VPN session is used as authentication of the remote user into the Digital Porch.

In step 230, remote user 120 activates link 270 to desired content (in this example, baby pictures). In step 235, gateway 110 transmits a signal to network device 105, according to a content protocol, requesting the content selected by remote user 120. The content protocol could be, e.g., Microsoft Windows™ SMB protocol, UPnP Content Protocol, or any other suitable protocol (standardized, open or proprietary).

The Content Protocol should be able to provide the following functionality. The content protocol may allow write capability from client to server. In this configuration, the "server" is network device PC 105 and the "client" is gateway 110. The content protocol must allow read capability of the server by the client. Third, the content protocol should also have a security mechanism to authenticate the client-to-server connection. The content protocol may display content from server on client as local client content, as though it was part of the client's local file system. Also, the content protocol must allow for file sharing of content between the server and the client.

Figure 2C:
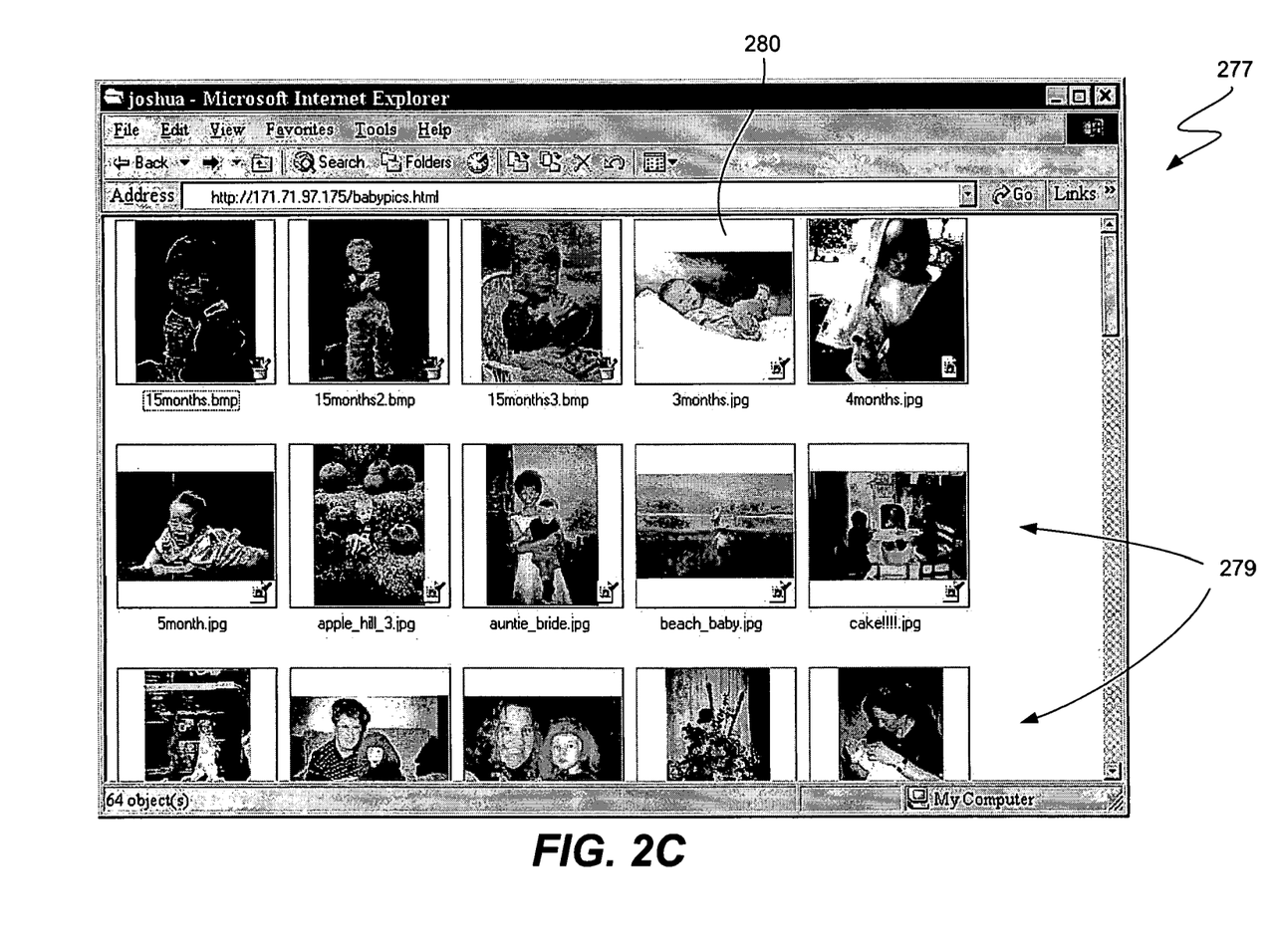
FIG. 2C depicts an exemplary dynamic page generated according to some implementations of the invention.

In step 240, network device 105 provides the necessary information to allow gateway 110 to generate another dynamic page in step 242. In step 245, gateway 110 displays the dynamic page to remote user 120. FIG. 2C depicts dynamic page 277, which is an example of one such page. Dynamic page 277 includes various thumbnails 279 of the baby pictures that remote user 120 desires to view.

Figure 2D:
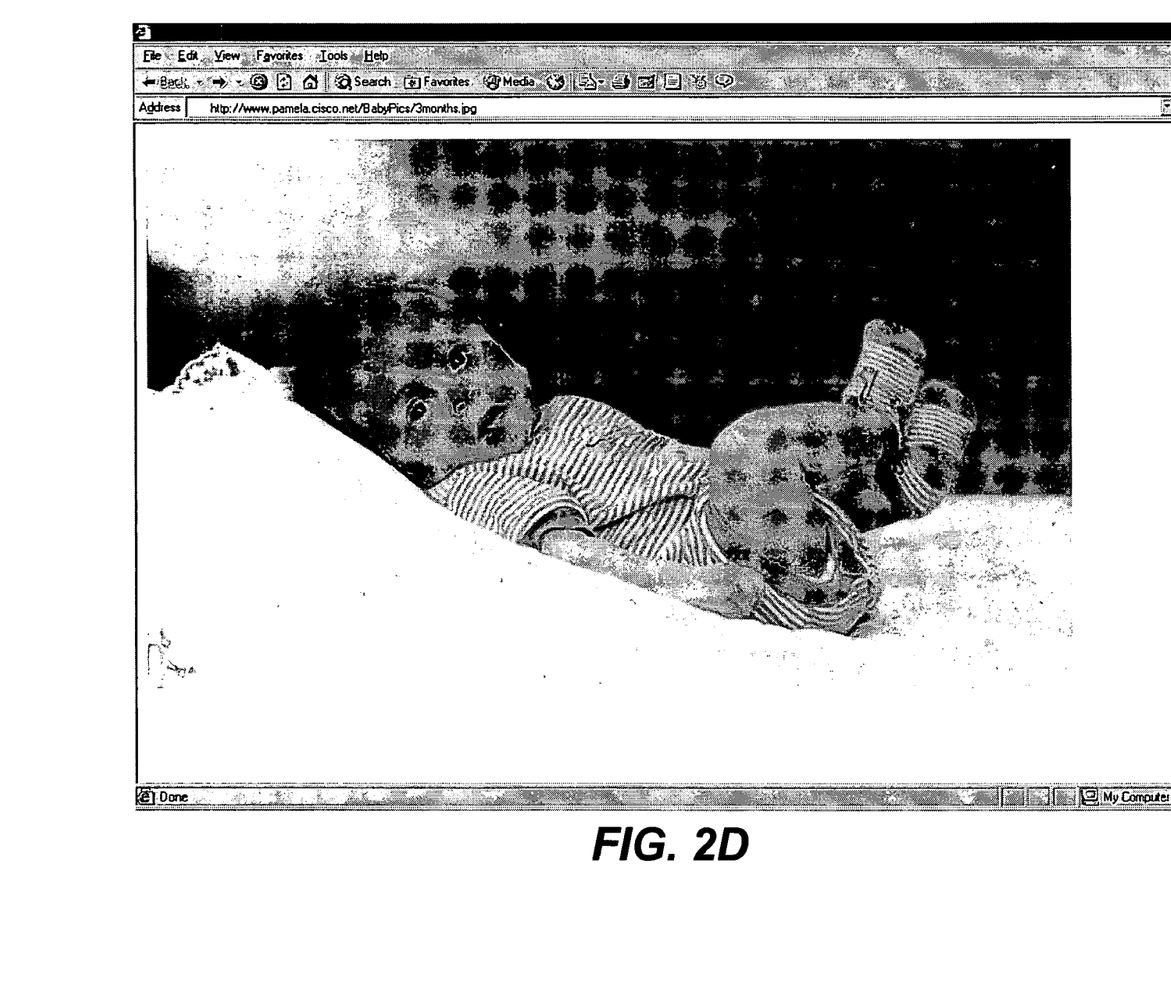
FIG. 2D depicts an exemplary page generated in response to a remote user's request to view an image.

Next, remote user 120 selects a desired file, in this example by clicking on thumbnail 280, a link to a .jpg file of a baby picture (step 250). In step 255, gateway 110 requests the selected .jpg file, which is provided by network device 105 in step 260. In step 265, the desired baby picture is displayed to remote user 120 (see FIG. 2D).

In the foregoing example, remote user 120 accessed a particular type of data stored on a device controlled (or accessible) by home network 100. However, the present invention also provides methods and apparatus for sharing services, devices, etc., controlled by home network 100. Accordingly, through some mechanism the device controlling home network 100 will learn about the various devices in the home network.

The following information should be known about each device: the device name, as used by the content protocol; the device address (e.g., the IP address); the type of device (e.g., hard drive, webcam, device for streaming audio data, etc.); the type of service and/or data provided by the device (e.g., content folder sharing, streaming image, motion jpg, etc.); authentication information required to access the device's content-serving services (e.g., username and password, SSL certificate, etc.); the users or groups of users allowed to access this device's services; and what rights each individual user or device has (e.g., read, write, delete).

According to some preferred embodiments, all unspecified users or groups or devices will be denied; moreover, unspecified users, groups or devices will not be able to determine what content or services exist. Access can be controlled, for example, on a per-device basis, a per content item or a per-service basis.

In addition, the following information should be known: the service description; the service protocol (e.g., HTTP, HTTPS, SMB, UPnP, TCP, UDP, proprietary content protocol, etc.); the service port(s) (e.g., 80, 443, etc.); and the port, ports or port range exposed to the world for service. The port exposed to the world can be auto-generated by the system to help avoid conflicts normally experienced when setting up NAT rules for multiple devices/services of the same type. This may be used, for example, when non-IP devices internal to the home are used (e.g. locally attached hard drives).

A LAN Server Device is any device in the home that is hosting its own servers, such as a HTTP server, or FTP server. The LAN Server Device can be embedded, such as an Internet Camera, or a PC running a Web Server software. Its content is directly accessible via the server, and does not require Digital Porch to proxy the server session as its own session to the remote user.

Figure 3:
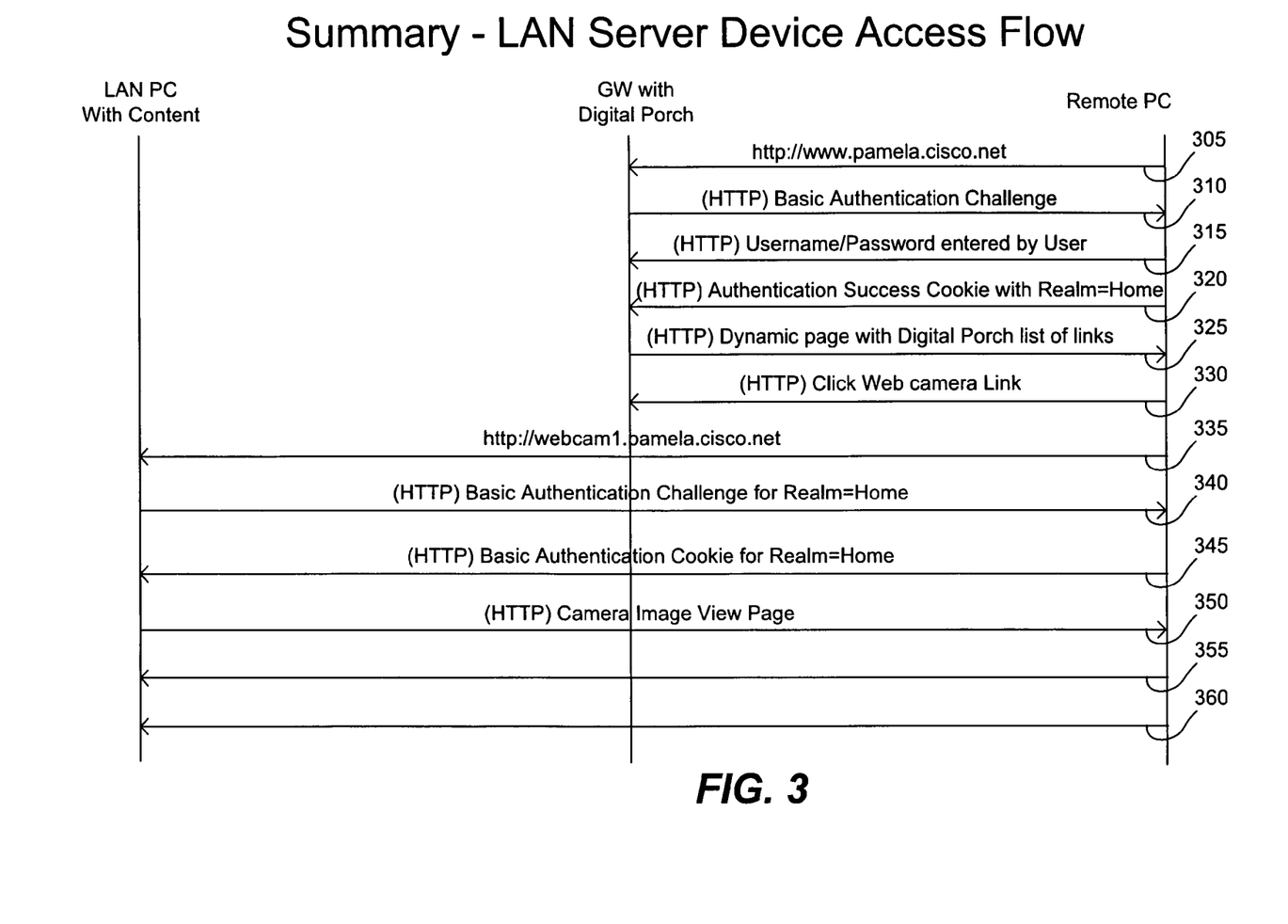
FIG. 3 is a flow diagram illustrating a method of allowing access and control of a webcam in a home network by a remote user.

An implementation for sharing access to a device on a home network, thereby providing services to a remote user, will now be described with reference to FIGS. 3 through 6. As shown in FIG. 3, the overall flow of the process is quite similar to that described above with respect to FIG. 2.

In step 305, remote user 120 has attempted to access home network 100. Digital Porch makes an authentication challenge in step 310 and remote user 120 successfully logs in (step 315). As above, Digital Porch will capture the source IP address of the remote user's HTTP session to configure the appropriate NAT port translations and firewall rules on the gateway to allow access to LAN devices by that IP address only. In step 320, an authentication success cookie is set with REALM=home.

The username and password are propagated by using the "REALM" method provided by basic authentication in HTML. As known by those of skill in the art, a "REALM" is a database of usernames and passwords that identify valid users of a web application (or set of web applications), plus an enumeration of the list of roles associated with each valid user. Roles are similar to groups in Unix-like operating systems, because access to specific web application resources is granted to all users possessing a particular role (rather than enumerating the list of associated usernames). A particular user can have any number of roles associated with his or her username.

Figure 4:
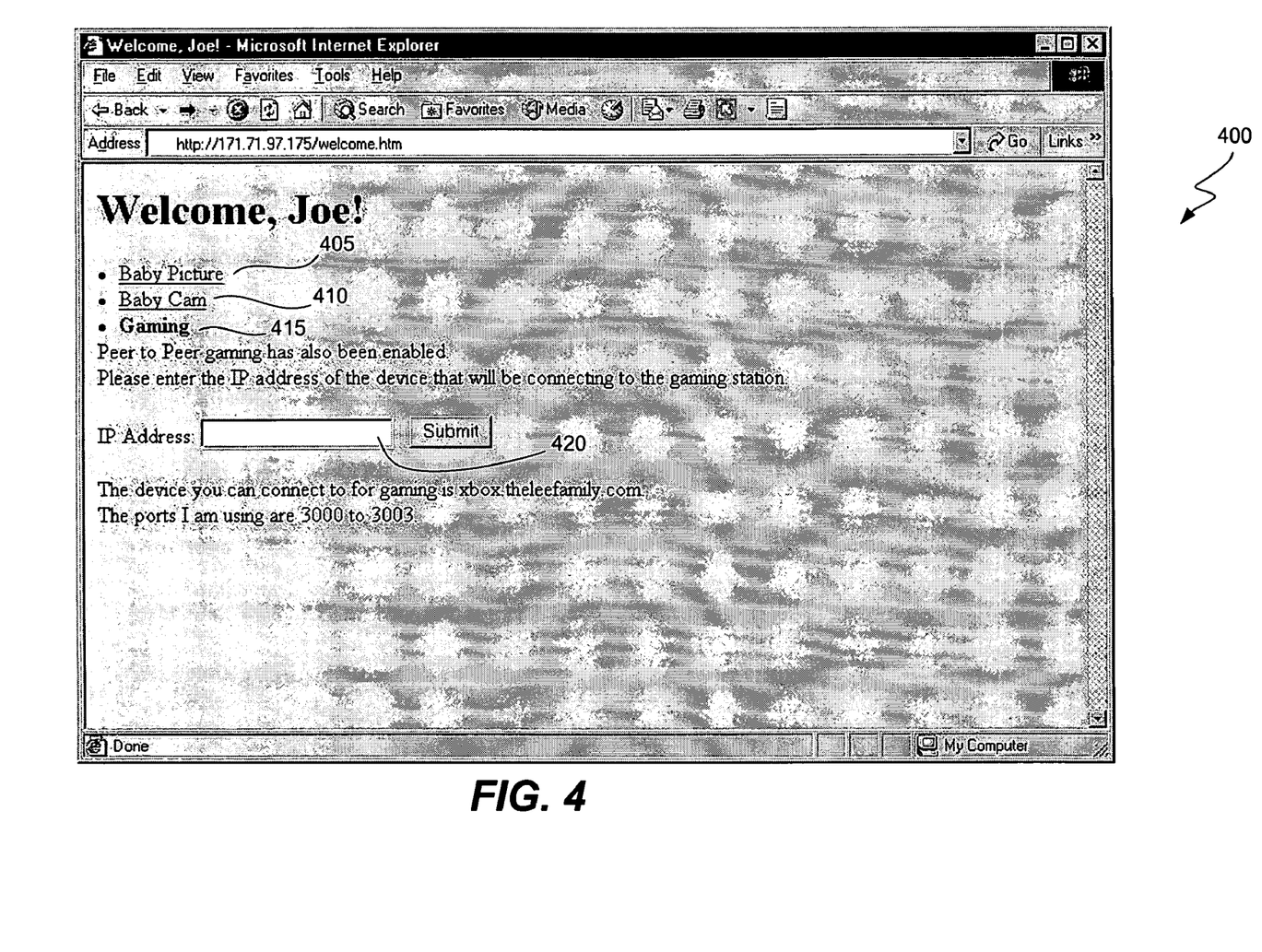
FIG. 4 is an exemplary welcome screen generated according to some implementations of the invention.

In step 325, gateway 110 sends a dynamic page to remote user 120. In this example, dynamic page 400 of FIG. 4 is displayed. Dynamic page 400 includes link 405 to a network device having content (here, PC 105), link 410 to webcam 150 and indication 415 that peer-to-peer gaming has been enabled. If remote user 120 desires to engage in peer-to-peer gaming, remote user 120 may enter the IP address of a device that remote user 120 will be connecting to the gaming station. Because the present invention uses secure protocols, authentication and encryption, peer-to-peer gaming is facilitated without compromising the security of home network 100.

Previously, there were two basic methods for allowing remote players to play interactive games with one another. One method is implemented in an application layer gateway ("ALG"). In response to a prompt to initiate a particular game, the ALG makes certain predetermined ports available that were known to be used by the game at the time the ALG was designed. Accordingly, the ALG may not make the proper ports available in response to, e.g., a subsequent release of the same game.

A second method is implemented by, e.g., the Xbox™ games provided by Microsoft™. This method uses the UPnP protocol's NAT traversal mechanism to allow the Xbox™ that initiates the game to open whatever ports the Xbox™ designates on a UPnP enabled gateway. Because UPnP is not a secure protocol, this feature allows an inordinate amount of control by the Xbox™ over the server. It seems likely that a hacker could use this method to access restricted content and/or otherwise control a server in undesirable ways. As such, gateway equipment manufacturers do not support NAT traversal as part of their UPnP implementation.

However, in this example, remote user 120 clicks on link 410 in step 330, thereby selecting webcam 150. In preferred implementations, authentication information (e.g., username and password) is propagated either by authenticating remote user 120 into all allowed devices at once by an underlying content protocol, or by using the REALM method provided by basic authentication in HTML. If the IP address of remote user 120 has been snooped and the browser client of remote user 120 does not contain proper REALM method encrypted username and password, access will be denied. If using any other protocol, the LAN Server device will authenticate remote user's session by using the underlying content protocol.

In steps 335 through 345, authentication information is propagated to webcam 150 by the browser client of remote user 120 responding to the authentication challenge of webcam 150 (step 340) with the authentication cookie set in step 320. Therefore, in this example, remote user 120 does not need to do anything further to propagate this authentication information. In other implementations, remote user 120 must take some action to respond to the authentication challenge of step 340, e.g., enter another username and password.

Figure 5:
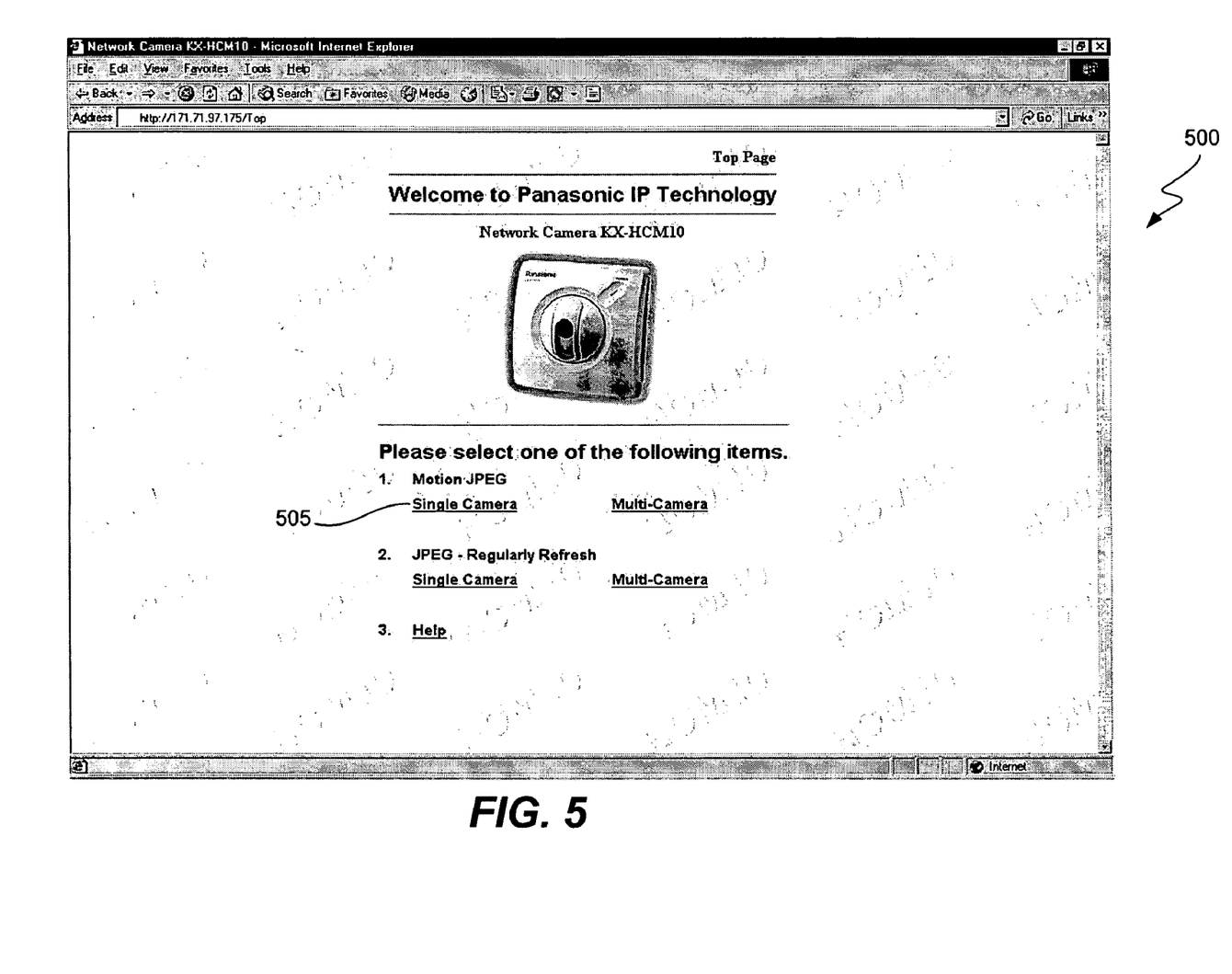
FIG. 5 is an exemplary screen generated to allow a remote user to select device options according to some implementations of the invention.
Figure 6:
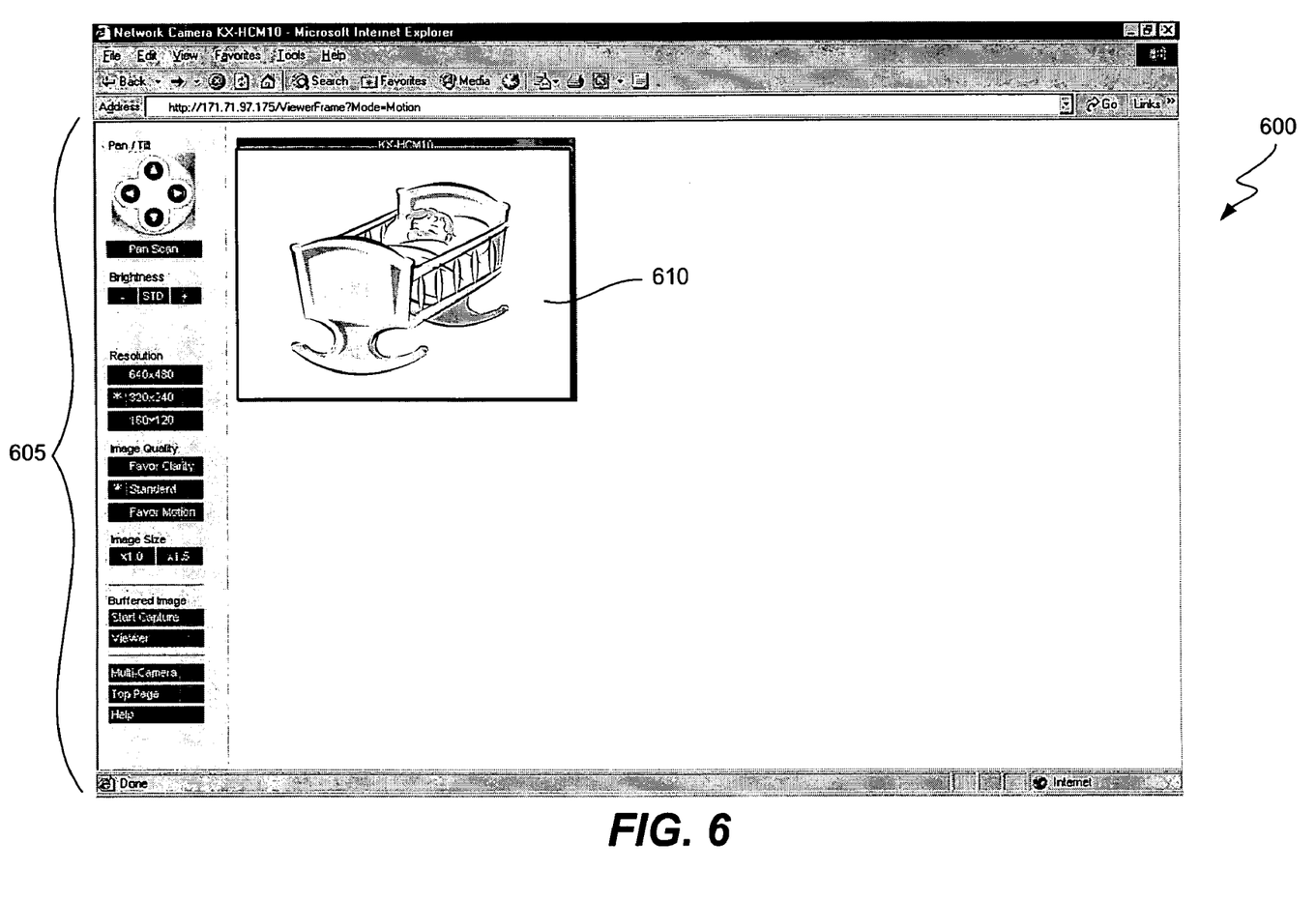
FIG. 6 is an exemplary screen generated to allow a remote user to view streaming video and control a webcam according to some implementations of the invention.

In step 350, the LAN Server device's main view page will be displayed to remote user 120. Here, page 500 is displayed, providing remote user 120 various options for controlling webcam 150. In step 355, remote user 120 clicks on link 505, allowing motion JPEG files to be streamed from a single camera in step 360. In this example, page 600 is displayed to remote user 120. Page 600 includes various controls 605 for allowing remote user 120 to control various aspects of image 610.

Those of skill in the art will realize that the webcam of the foregoing embodiment was selected only by way of example and that various other webcams (and other peripheral devices) may be used in accordance with the present invention. For example, webcams supplied by Linksys, a division of the present assignee, may be used.

Figure 7:
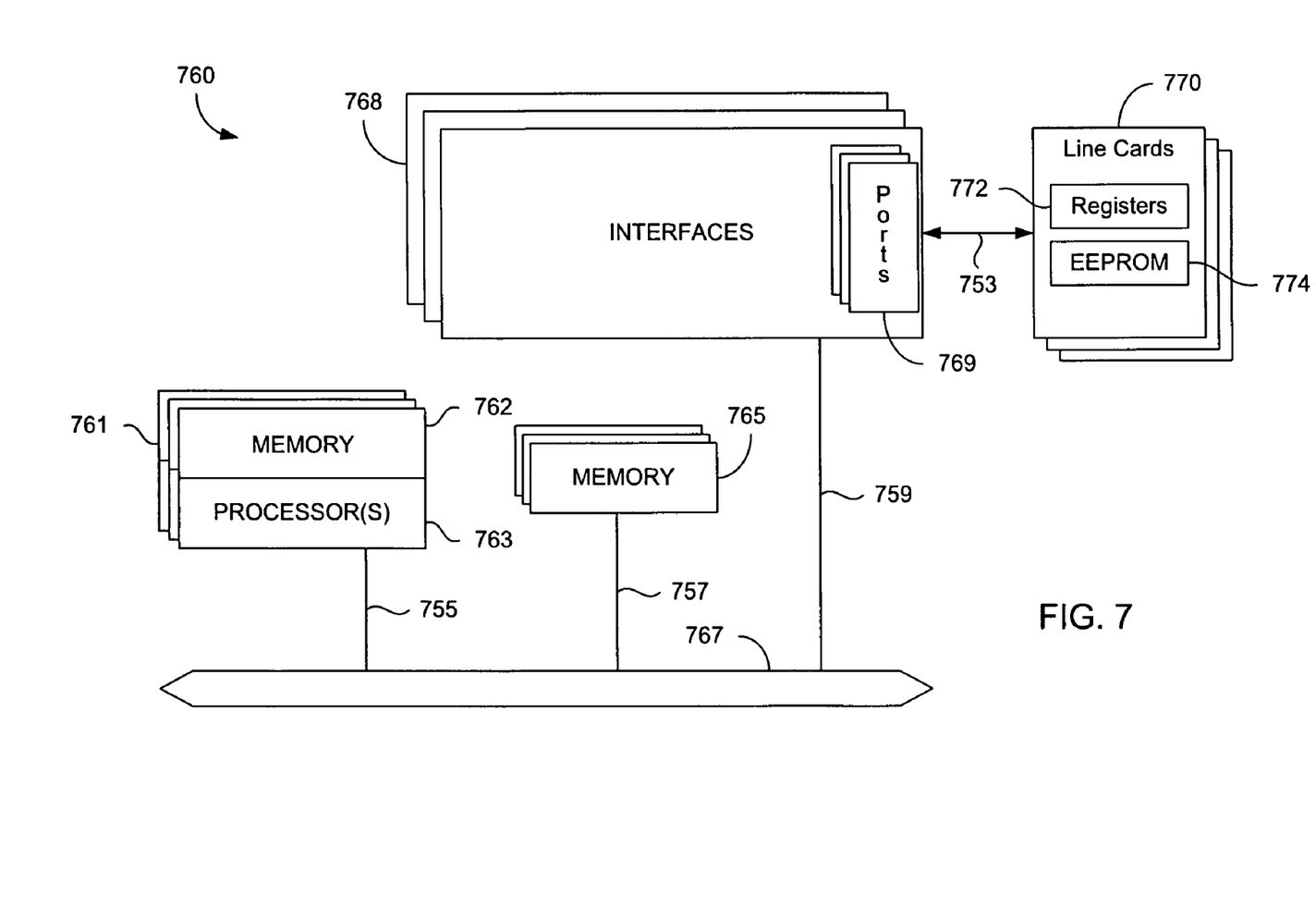
FIG. 7 illustrates an example of a network device that may be configured to implement some methods of the present invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "line cards"). Generally, interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 7) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A computer readable storage medium with a computer program stored thereon for providing controlled access to a home network, the computer program including instructions for causing one or more devices of the home network to perform steps comprising:
   receiving a log-in attempt from a remote user, the log-in attempt originating from an Internet protocol address, the remote user communicating with the home network via a first protocol suitable for Internet communication;
   verifying that the remote user is an authorized user of the home network;
   generating a network address translation rule associating the Internet protocol address with a port of a device on the home network;
   dynamically generating a Web page, the Web page including links to content on one or more devices on the home network, the content accessible to the one or more devices via a second protocol, the second protocol being different from the first protocol, the second protocol being a content protocol that allows local file sharing of content, wherein the local file sharing of content comprises one or more devices reading files stored on one or more different devices, the Web page graphical user interface allowing the remote user to select only content or services that the remote user is authorized to select;
   transmitting, from a gateway of the home network, the Web page to the remote user;
   receiving a selection request from the remote user;
   receiving content from the device using the content protocol and without accessing a Web server; and
   providing content or services to the remote user according to the selection request, wherein the receiving, verifying, generating and providing are performed by one or more devices of the home network.

2. The computer-readable medium of claim 1, the computer program further comprising instructions for causing the gateway of the home network to transmit authentication information regarding the remote user to one or more devices of the home network after verifying that the remote user is an authorized user of the home network.

3. The computer-readable medium of claim 1, wherein the first protocol is HTTP.

4. The computer-readable medium of claim 1, wherein the second protocol is one of Windows networking (smb) or UPnP.

5. A gateway configured to provide controlled access to a home network, the gateway comprising:
   a first port configured to receive a log-in attempt from a remote user, the log-in attempt originating from an Internet protocol address, the remote user communicating with the home network via a first protocol suitable for Internet communication;
   a second port configured for attaching a network device of the home network; and
   at least one processor configured to:
      verify that the remote user is an authorized user of the home network;
      generate a network address translation rule associating the Internet protocol address with the second port;
      dynamically generate a Web page, the Web page including links to content on one or more devices on the home network, the content accessible to the gateway via a second protocol, the second protocol being different from the first protocol, the second protocol being a content protocol that allows local file sharing of content, wherein the local file sharing of content comprises one or more devices reading files stored on one or more different devices, the Web page allowing the remote user to select only content or services that the remote user is authorized to select;
      transmit the Web page to the remote user;
      receive a selection request from the remote user;
      receive content from the network device using the content protocol and without accessing a Web server; and
      provide content or services to the remote user from the network device attached to the second port according to the selection request.

6. A method of providing controlled access to a home network, the method comprising:
   receiving, at the home network, a log-in request from a remote user the remote user communicating with the home network via a first protocol suitable for Internet communication;
   capturing, at the home network, the remote user's Internet protocol address;
   authenticating the remote user;
   automatically providing access to predetermined content, services or devices by the authenticated remote user;
   dynamically generating a Web page, the Web page including links to content on one or more devices on the home network, the content accessible to the gateway via a second protocol, the second protocol being different from the first protocol, the second protocol being a content protocol that allows local file sharing of content, wherein the local file sharing of content comprises one or more devices reading files stored on one or more different devices, the Web page allowing the remote user to select from the predetermined content, services or devices;
   automatically transmitting, from a gateway of the home network, the Web page to the remote user;
   receiving content from a network device using the content protocol and without accessing a Web server; and
   providing access to a portion of the predetermined content, services or devices according to a selection of the remote user.

7. A home network, comprising:
   a first network device configured to provide content using a content protocol, wherein the first network device is not configured to provide content via a Web server; and
   a gateway comprising a first port and a second port, the gateway configured to
      communicate with the first network device via the first port;
      communicate with an external network via the second port;
      receive a log-in attempt from a remote user, the log-in attempt originating from an address on the external network, the remote user communicating with the home network via a first protocol suitable for Internet communication;
      verify that the remote user is an authorized user of the home network;
      generate a network address translation rule associating the address with the first port;
      dynamically generate a Web page, the Web page including links to content on one or more devices on the home network, the content accessible to the gateway via a second protocol, the second protocol being different from the first protocol, the second protocol being a content protocol that allows local file sharing of content, wherein the local file sharing of content comprises one or more devices reading files stored on one or more different devices, the Web page allowing the remote user to select only content that the remote user is authorized to select;

transmit the Web page to the remote user;

receive a first selection request from the remote user;

receive content from the first network device using the content protocol; and provide content to the remote user from the first network device according to the first selection request.

8. The home network of claim 7, wherein the first network device comprises a personal computer or a network attached storage device.

9. The home network of claim 7, further comprising a second network device, the gateway being further configured to:

display the graphical user interface to the remote user, the graphical user interface allowing the remote user to select services from the second network device that the remote user is authorized to select;

receive a second selection request from the remote user; and provide services to the remote user from the second network device according to the second selection request.

10. The home network of claim 9, wherein the second network device is a webcam or a device for streaming audio data.

11. A method for providing controlled access to a home network, the method performed by one or more devices of the home network, the method comprising:

receiving a log-in attempt from a remote user, the log-in attempt originating from an Internet protocol address, the remote user communicating with the home network via a first protocol suitable for Internet communication;

automatically verifying that the remote user is an authorized user of the home network;

automatically generating a network address translation rule associating the Internet protocol address with a port of a device on the home network;

automatically generating a Web page, Web page including links to content on one or more devices on the home network, the content accessible to the one or more devices of the home network via a second protocol, the second protocol being different from the first protocol, the second protocol being a content protocol that allows local file sharing of content, wherein the local file sharing of content comprises one or more devices reading files stored on one or more different devices, the Web page allowing the remote user to select only content or services that the remote user is authorized to select;

transmitting, from a gateway of the home network, the Web page to the remote user;

receiving a selection request from the remote user;

receiving content from the device using the content protocol and without accessing a Web server; and automatically providing content or services to the remote user according to the selection request, wherein the receiving, verifying, generating and providing are performed by one or more devices of the home network.

12. The method of claim 11, further comprising the step of automatically transmitting authentication information regarding the remote user to one or more devices of the home network after automatically verifying that the remote user is an authorized user of the home network.

13. The method of claim 11, wherein the first protocol is HTTP.

14. The method of claim 11, wherein the second protocol is one of Windows networking (smb) or UPnP.

15. A gateway for providing controlled access to a home network, the gateway comprising:

means for receiving a log-in attempt from a remote user, the log-in attempt originating from an Internet protocol address, the remote user communicating with the home network via a first protocol suitable for Internet communication;

means for verifying that the remote user is an authorized user of the home network;

means for generating a network address translation rule associating the Internet protocol address with a port of a device on the home network;

means for dynamically generating a Web page, the Web page including links to content on one or more devices on the home network, the content accessible to the gateway via a second protocol, the second protocol being different from the first protocol, the second protocol being a content protocol that allows local file sharing of content, wherein the local file sharing of content comprises one or more devices reading files stored on one or more different devices, the Web page allowing the remote user to select only content or services that the remote user is authorized to select;

means for transmitting the Web page to the remote user;

means for receiving a selection request from the remote user;

means for receiving content from the device using the content protocol and without accessing a Web server; and means for providing content or services to the remote user according to the selection request.

* * * * *